(12) United States Patent
Cai

(10) Patent No.: US 8,593,660 B1
(45) Date of Patent: Nov. 26, 2013

(54) PRINT SERVER AND METHOD FOR PRINT FORWARDING FOR A WIRELESS DEVICE

(75) Inventor: Zheng Cai, Fairfax, VA (US)

(73) Assignee: Nextel Communications Inc., Reston, VA (US)

(*) Notice: Subject to any disclaimer, the term of this patent is extended or adjusted under 35 U.S.C. 154(b) by 1639 days.

(21) Appl. No.: 11/604,789

(22) Filed: Nov. 28, 2006

(51) Int. Cl.
G06F 3/12 (2006.01)
G06F 13/00 (2006.01)

(52) U.S. Cl.
USPC ............................................. 358/1.15; 710/33

(58) Field of Classification Search
None
See application file for complete search history.

(56) References Cited

U.S. PATENT DOCUMENTS

| | | | |
|---|---|---|---|
| 5,471,564 A * | 11/1995 | Dennis et al. | 358/1.15 |
| 2002/0013869 A1 * | 1/2002 | Taniguchi et al. | 710/33 |
| 2003/0079134 A1 * | 4/2003 | Manchala et al. | 713/182 |
| 2004/0184073 A1 * | 9/2004 | Shahindoust | 358/1.15 |
| 2006/0053064 A1 * | 3/2006 | Bornstein et al. | 705/26 |
| 2006/0146358 A1 * | 7/2006 | Sattler et al. | 358/1.14 |
| 2009/0033985 A1 * | 2/2009 | Platov | 358/1.15 |
| 2009/0066985 A1 * | 3/2009 | Ferlitsch | 358/1.13 |

FOREIGN PATENT DOCUMENTS

JP 2005-234692 * 9/2005

* cited by examiner

Primary Examiner — Vincent Rudolph

(57) ABSTRACT

A print server and method for forwarding printing data in a network are provided. The print server receives an IP address of a printer and a uniform resource identifier of printing data from a mobile station. The print server determines which printer corresponds to the IP address and forwards the printing data to the printer for printing, thereby allowing a mobile station to print data in remote locations. The mobile station does not have to format the printing data or transmit the formatted printing data, thereby reducing the burden on the operating system and the storage space of the mobile station.

19 Claims, 4 Drawing Sheets

PRINT SERVER AND METHOD FOR PRINT FORWARDING FOR A WIRELESS DEVICE

BACKGROUND OF THE INVENTION

The present invention relates to a print server and method for forwarding printing data in a wireless network.

Network printing enables users in locations that are geographically separate from each other and from their printing devices to print data for themselves and others. Print servers enable multiple clients to share one or more print devices. For a user to print a document, he has to locate a printer in a target location that supports the features necessary to produce the document. After such a printer is located, the user connects to it.

FIG. 1 illustrates a network printing architecture according to the related art. Network printing components include a print server spooler (not shown) on a Microsoft® Windows® Server 2003 Print Server 130 and a client spooler 114 running on a Microsoft® Windows®-based Client (client computer) 110. The Microsoft® Windows®-based application 111 generates printable data. After generating an enhanced metafile (EMF), which is a data type used between a print client and a server, a graphics device interface (GDI) 112 releases console control. The EMF data is interpreted in the background on a spooler thread and sent to the printer driver 113, which communicates with print devices to generate an output from data supplied by the GDI 112. The client spooler 114 delivers print jobs from applications on the client computer 110 to the print server 130. The print server spooler manages the printing process, which includes retrieving the location of the correct printer driver, loading the driver, spooling high-level function calls into a print job, scheduling the print job for printing, etc. Through a print router, the print job will be routed to a local printer 140 which handles the print job. A remote print server 150 and remote printer 160 may also be connected to the print server 130. In a non-Microsoft® Windows®-based client 120, a non-Microsoft® Windows®-based application 121 and a client server communication protocol 122 generate and process the printing data, which is outputted to the printer server 130.

Printing with mobile stations, such as personal digital assistants (PDAs), cellular telephones, handheld computers, etc., can be problematic in a network environment. Mobile stations have a scaled-down operating system, which may not include a print function. Also, mobile stations have a limited memory space. For example, the Blackberry® 8700 from Research In Motion Limited has a 16 MB RAM and 64 MB flash memory. Due to their limitations, mobile stations do not always have built-in printing capabilities. Thus, printing documents from a mobile station is limited by the operating system and storage capacity of the mobile station. Accordingly, the formatting, storage and transmission of printing data are limited in mobile stations.

SUMMARY OF THE INVENTION

The present invention provides a print server and method for forwarding printing data in a network, which overcome the problems of the prior art. In a method for forwarding printing data in a network according to the present invention, a print server receives an IP address of a printer and a uniform resource identifier of printing data from a mobile station. The print server determines which printer corresponds to the IP address and forwards the printing data to the printer for printing, thereby allowing a mobile station to print documents and/or other data in remote locations. Accordingly, the mobile station does not have to format the printing data or transmit the formatted printing data, which reduces the burden on mobile station operating systems and storage space.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
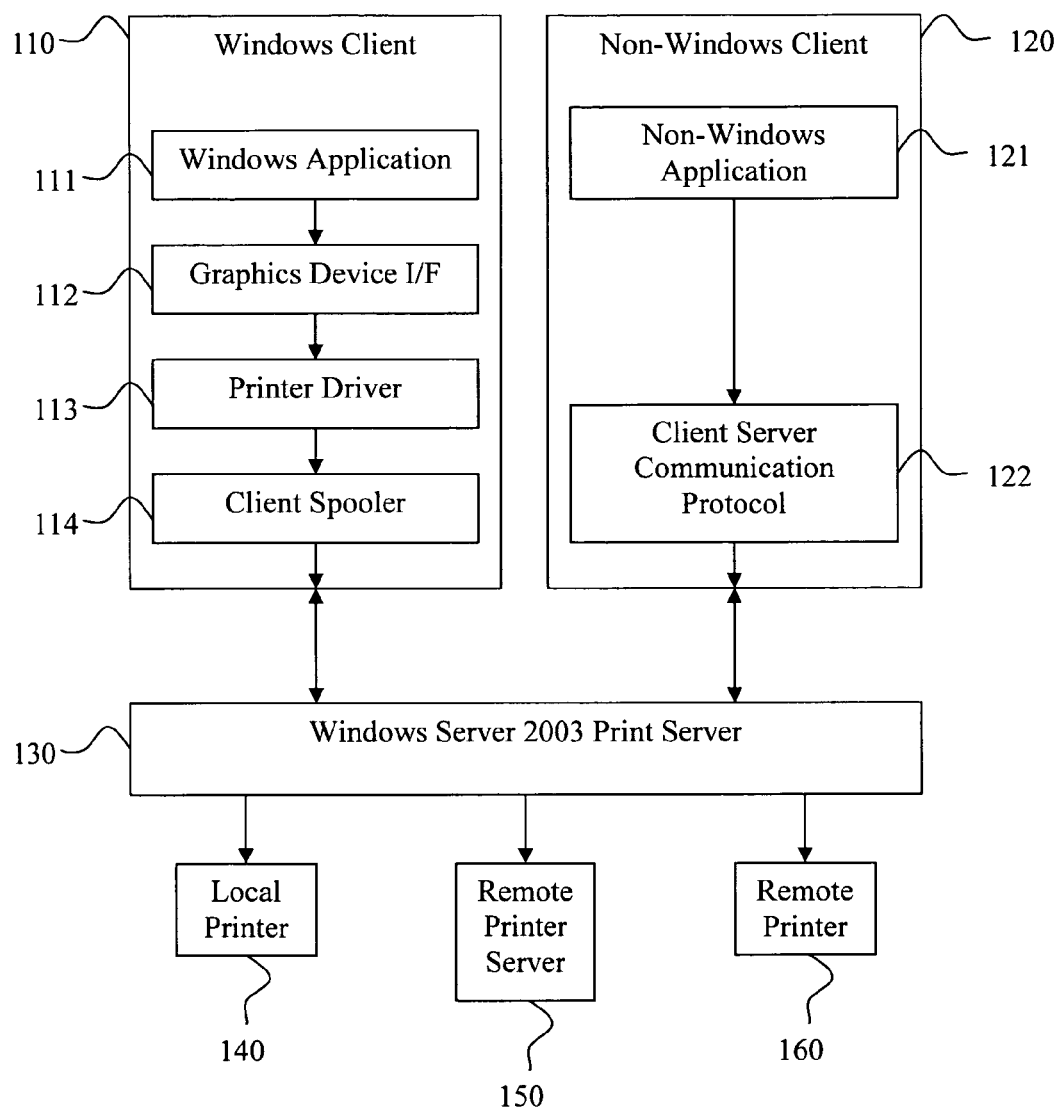
FIG. 1 illustrates a network printing architecture according to the related art.
Figure 2:
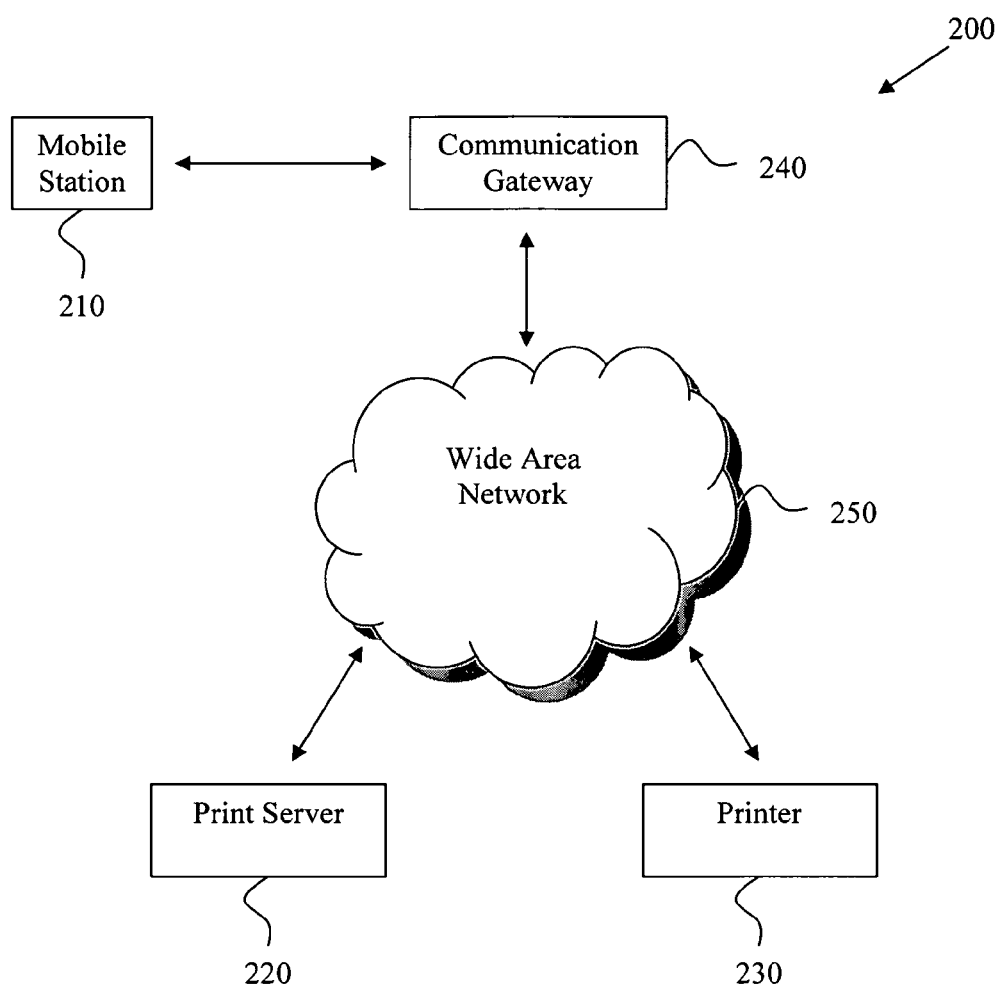
FIG. 2 illustrates an exemplary embodiment of a system for forwarding printing data in a network, in accordance with the present invention.

FIG. 2 illustrates an exemplary embodiment of a system for forwarding printing data in a network, in accordance with the present invention. The system 200 may include one or more networks in which a mobile station 210, a print server 220 and a printer 230 may reside. The printer server 220 can be any type of print server, including a Microsoft® Windows®-based print server, Linux-based print server, Unix-based print server, etc. A communication gateway 240 may be disposed between the mobile station 210 and the print server 220 for providing an interface between these elements of the system. FIG. 2 illustrates the elements of the system on a Wide Area Network (WAN) 250, however, a plurality of WANs and/or Local Area Networks (LANs) and/or other networks may be included in the system.

The print server 220 may be a default print server for the mobile station 210. In particular, the IP address of the print server 220 may be assigned to the mobile station 210 during an initial set up operation of the mobile station 210. Any print server accessible by the mobile station 210 may be assigned as the default print server, but the print server of the mobile station's home network would normally be chosen as the default print server.

According to an exemplary embodiment of the present invention, when the mobile station 210 is away from its home network, the mobile station 210 may use local printers to print data. The mobile station 210 transmits printing data to the print server 220, which forwards the printing data to the printer 230 for printing. Accordingly, the mobile station 210 can print documents and/or other data on a printer 230 that is nearby the mobile station 210, by forwarding the data via the print server 220 in the home network of the mobile station 210. The print server 220 may format the printing data prior to forwarding it to the printer 230, and may transmit the formatted printing data wirelessly or via a wired connection. Thus, the printer 230 does not need to have its own print server for formatting the data. In the system, the printer 230 and the print server 220 may be located separately from each other. An exemplary embodiment of a print server and a print forwarding process in accordance with the present invention are further described below.

Figure 3:
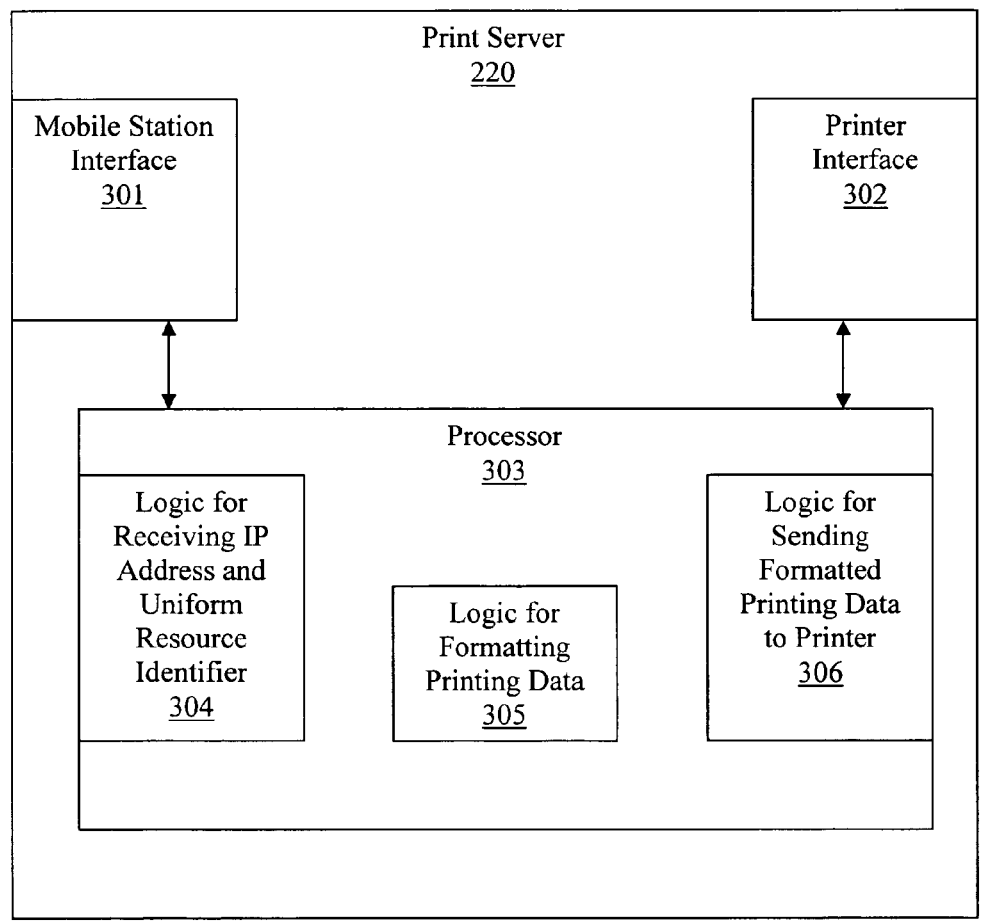
FIG. 3 illustrates an exemplary embodiment of a print server in accordance with the present invention.

FIG. 3 illustrates an exemplary embodiment of a print server in accordance with the present invention. The print server 220 illustrated in FIG. 3 includes a mobile station interface 301, a printer interface 302, and a processor 303. The mobile station interface 301 provides an interface for mobile stations to connect to the print server 220 and an input for receiving printing data from the mobile stations. Likewise, the printer interface 302 provides an interface for printers to connect to the print server 220 and receive printing data from the print server 220. The processor 303 may include a plurality of logic portions, including Logic for Receiving IP Address and Uniform Resource Identifier 304, Logic for Formatting Printing Data 305, and Logic for Sending Formatted Printing Data to Printer 306. The receiving, formatting, and sending operations of these logic portions are described below with regard to a method for print forwarding.

Figure 4:
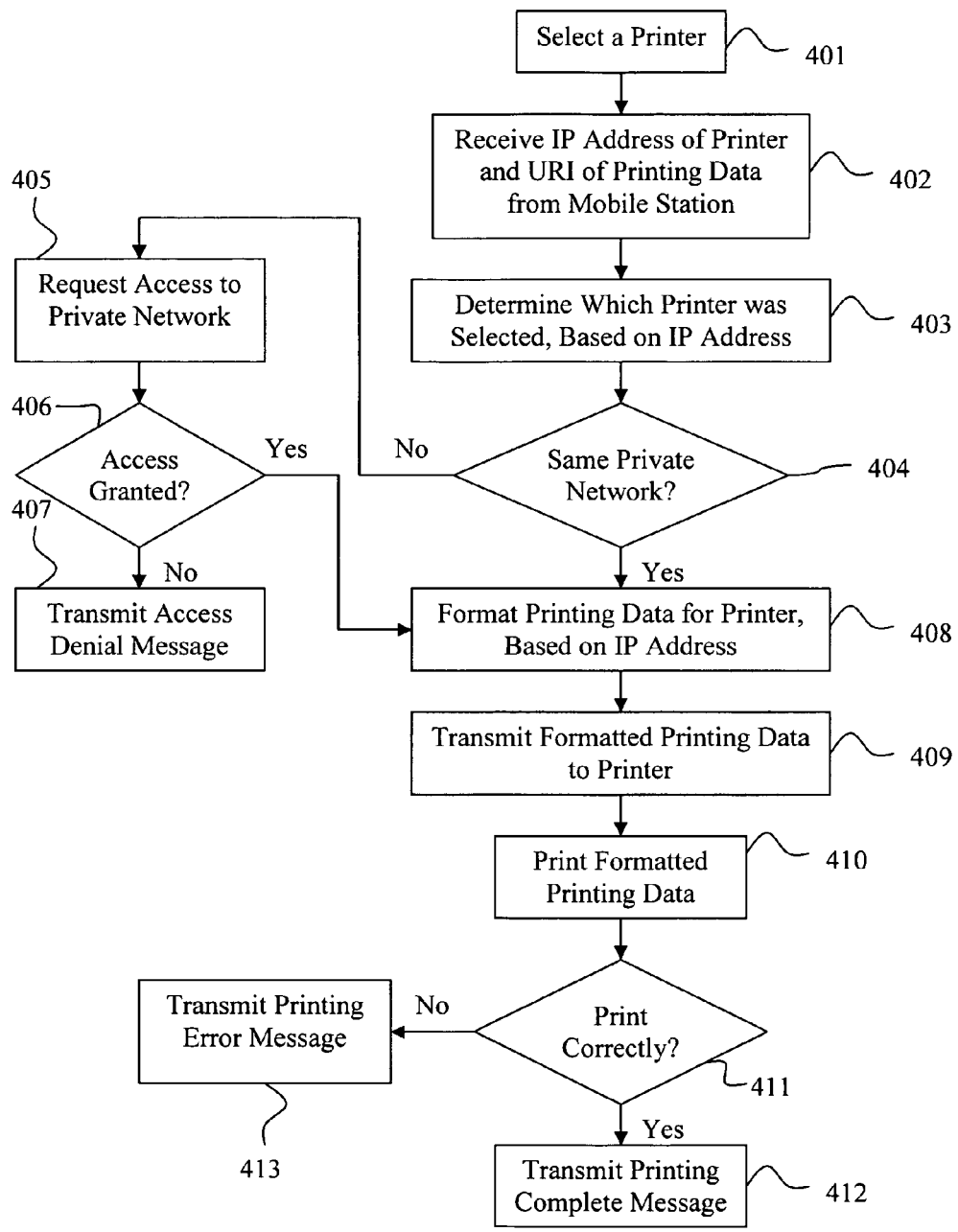
FIG. 4 illustrates an exemplary embodiment of a method for forwarding printing data in a network to a local printer that is to be used for printing the printing data, in accordance with the present invention.

FIG. 4 illustrates an exemplary embodiment of a method for forwarding printing data in a network to a local printer that is to be used for printing the printing data, in accordance with the present invention. In step 401, a mobile station 210 may select a printer 230 to be used for printing the printing data. The Logic for Receiving IP Address and Uniform Resource Identifier 304 receives an IP address of the selected printer 230 and a uniform resource identifier (URI) of the printing data from the mobile station 210 in step 402. The print server 220 may determine which printer 230 has been selected based upon the received IP address in step 403. For example, the print server 220 may look up the received IP address in a look-up table or database, which indicates the corresponding printer.

In step 404, a determination is made whether the printer 230 and the print server 220 are on the same private network. If they are not on the same private network, then in step 405 the print server may attempt to access the network on which the printer is located. A determination may be made in step 406 of whether access to the printer's network is granted. If access is not granted, an access denial message may be transmitted in step 407 to the mobile station 210 via the print server 220. If access to the printer's network is granted in step 406, the Logic for Formatting Printing Data 305 formats the printing data for the printer 230 in step 408, based upon the received IP address of the printer 230. Also, if the printer and the print server are on the same private network, as determined in step 404, the method proceeds to step 408.

In step 409, the formatted printing data is transmitted to the printer 230 by the Logic for Sending Formatted Printing Data to Printer 306. In step 410, the formatted printing data is printed by the printer 230.

In step 411, a determination is made whether the printing data was printed correctly. If the printing data was printed correctly, a printing complete message may be transmitted to the mobile station 210 via the print server 220 in step 412. If the printing data did not print correctly or if a predetermined amount of time has passed since the printing data was sent to the printer, an error message may be transmitted to the mobile station 210 via the print server 220 in step 413.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A print server comprising:
    a first interface coupled to a mobile station located outside the coverage area of the mobile station's home network;
    a second interface coupled to a printer located outside the coverage area of the mobile station's home network, wherein the mobile station and the printer are in communication with a first private network; and
    a processor comprising:
        logic for receiving, from the mobile station, printing data, an IP address of the printer, and a uniform resource identifier of the printing data;
        logic for formatting the printing data for the printer into formatted printing data, wherein the formatted printing data is a different format from the printing data received from the mobile station;
        logic for sending the formatted printing data to the printer using the second interface;
        logic for determining at the printing server whether the formatted printing data was printed correctly from the printer; and
    transmitting a message to the mobile station from the printing server indicative of whether the formatted printing data was printed correctly,
    wherein the print server is located inside the coverage area of the mobile station's home network and is in communication with a second private network different from the first private network.

2. The print server of claim 1, wherein the formatted printing data is formatted for the printer, based upon the IP address of the printer.

3. The print server of claim 1, wherein the uniform resource identifier indicates a location of the printing data.

4. A method for transmitting printing data in a network, comprising the acts of:
    selecting, in a mobile station located outside the coverage area of the mobile station's home network, a printer for printing the printing data, wherein the mobile station is in communication with a first private network;
    transmitting the printing data, an IP address of the selected printer, and a uniform resource identifier of the printing data from the mobile station to a print server in communication with a second private network different from the first private network,
    wherein the print server is located inside the coverage area of the mobile station's home network,
    formatting the printing data into formatted printing data, wherein the formatted printing data has a different format from the printing data received from the mobile station;
    transmitting the formatted printing data from the print server to the printer, wherein the printer is located outside the coverage area of the mobile station's home network,
    wherein the printer is in communication with the first private network and located within the coverage area of a network serving the mobile station,
    determining whether the formatted printing data was printed correctly from the printer; and
    receiving a message at the mobile station indicative of whether the formatting printing data was printed correctly.

5. The method of claim 4, wherein the mobile station is a mobile telephone.

6. The method of claim 4, wherein the mobile station is a personal digital assistant.

7. The method of claim 4, wherein the selected printer is not a default printer of the mobile station.

8. The method of claim 4, wherein the IP address is used to format the printing data for the printer.

9. A method for forwarding printing data in a network to a printer, comprising the acts of:
- receiving, by a print server located at a home network of a mobile station from the mobile station, printing data, an IP address of the printer, and a uniform resource identifier of the printing data from the mobile station, wherein the print server is in communication with a first network;
- formatting the printing data for the printer into formatted printing data, wherein the formatted printing data has a different format from the printing data received from the mobile station;
- outputting the formatted printing data from the print server to the printer,
- wherein the printer is located outside the coverage area of the mobile station's home network,
- wherein the printer is in communication with a second network different from the first network and located within the coverage area of a network serving the mobile station,
- determining at the print server whether the formatted printing data was printed correctly from the printer; and
- transmitting a message to the mobile station from the print server indicative of whether the formatted printing data was printed correctly.

10. The method of claim 9, further comprising identifying the first network and the second network based on the IP address of the printer and on an IP address of the print server.

11. The method of claim 9, wherein the first network and the second network are local area networks (LAN).

12. The method of claim 9, wherein the first network and the second network are in communication with a wide area network (WAN).

13. The method of claim 9, wherein the formatting of the printing data is based upon the IP address of the printer.

14. The method of claim 9, wherein the uniform resource identifier indicates a location of the printing data.

15. The method of claim 9, wherein the formatted printing data is outputted from the print server to the printer via a wireless connection.

16. The method of claim 9, further comprising the act of: printing the printing data using the printer.

17. The method of claim 16, further comprising the act of: outputting a printing complete message to the mobile station, after the printing data has been printed.

18. The method of claim 16, further comprising the act of: outputting an error message to the mobile station, if the printing data has not been printed by the printer after a predetermined length of time.

19. The method of claim 9,
- wherein the print server attempts to access the second network via the first network, and
- wherein, if the print server cannot access the second network the printer server transmits a message to the mobile station indicating that access to the printer has been denied.

* * * * *